(12) United States Patent
Hirschler et al.

(10) Patent No.: US 12,352,100 B2
(45) Date of Patent: Jul. 8, 2025

(54) HEAT-INSULATING GLASS PANEL

(71) Applicants: Guardian Europe S.a.r.l., Bertrange (LU); Hirschler Automotive Glass Kft, Sopron (HU)

(72) Inventors: Laszlo Hirschler, Sopron (HU); Viktor Hirschler, Sopron (HU)

(73) Assignees: Guardian Europe S a r l, Bertrange (LU); Hirschler Automotive Glass Kft, Sopron (HU)

( * ) Notice: Subject to any disclaimer, the term of this patent is extended or adjusted under 35 U.S.C. 154(b) by 488 days.

(21) Appl. No.: 17/621,738

(22) PCT Filed: Jun. 25, 2020

(86) PCT No.: PCT/IB2020/056008
§ 371 (c)(1),
(2) Date: Dec. 22, 2021

(87) PCT Pub. No.: WO2020/261166
PCT Pub. Date: Dec. 30, 2020

(65) Prior Publication Data
US 2022/0259916 A1    Aug. 18, 2022

(51) Int. Cl.
*E06B 3/66* (2006.01)
*B32B 3/02* (2006.01)
*E06B 3/663* (2006.01)

(52) U.S. Cl.
CPC ............ *E06B 3/66333* (2013.01); *B32B 3/02* (2013.01); *E06B 3/66342* (2013.01); *E06B 2003/66338* (2013.01); *E06B 2003/66385* (2013.01)

(58) Field of Classification Search
CPC .. E06B 3/66; E06B 3/663–66371; E06B 3/67; E06B 3/6715; E06B 2003/66385;
(Continued)

(56) References Cited

U.S. PATENT DOCUMENTS 3,579,317 A * 5/1971 Goto .................... E06B 3/67326
65/59.24
4,901,476 A * 2/1990 Nagashima .............. B60J 10/79
49/501
(Continued)

FOREIGN PATENT DOCUMENTS

CA    2813168 A1    4/2011
CH    672612 A5 *   12/1989
(Continued)

OTHER PUBLICATIONS

Machine translation of EP 0848133 A1.*
(Continued)

*Primary Examiner* — Z. Jim Yang

(57) ABSTRACT

The subject matter of this invention is a polygonal heat-insulating glass panel with straight edges and a flat surface, in which the two parallel flat glass panes (1) enclosing the inner space of the glass panel are connected to each other, at least on one side, by a transparent, hermetically sealed spacer (2), forming a closed frame with the other sides. The transparent spacer (2) is composed of an adhesive mould incorporating a transparent adhesive body (5) and an adhesive flange (6) applied between an outer edge sealing glass strip (4.1) and an inner edge sealing glass strip (4.2), where the width of the outer edge sealing glass strip (4.1) matches that of the glass panel, while the width of the inner edge sealing glass strip (4.2) closing the inner space of the glass panel matches that of the inner space of the glass panel. The ends of the flat glass panes (1) are chamfered to allow cutting through the adhesive flange (6) in a way that, at the edges of the flat glass panes (1), the sealing lip formed by chamfering touches the sealing surface 13 of the outer edge sealing glass strip (4.1) of the transparent spacer (2) pressed between the flat glass panes (1).

7 Claims, 2 Drawing Sheets

Figure 3A:
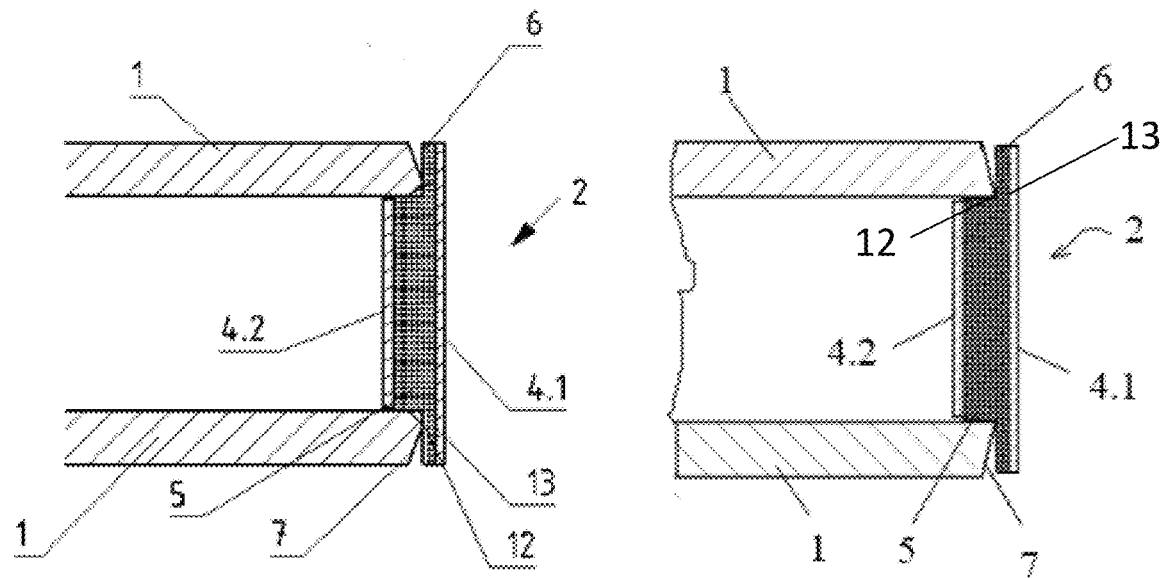

(58) Field of Classification Search
CPC . E06B 2003/66338; B06B 2003/66385; B06B 2003/66338; B32B 3/02; B32B 17/10–1099; Y10T 428/24777
See application file for complete search history.

(56) References Cited

U.S. PATENT DOCUMENTS

| | | | | |
|---|---|---|---|---|
| 5,405,468 | A * | 4/1995 | Olson | B32B 17/10036 156/101 |
| 5,908,675 | A * | 6/1999 | Marquardt | B32B 17/10155 428/209 |
| 5,948,195 | A | 9/1999 | Thomas | |
| 6,379,771 | B1 * | 4/2002 | Sato | B32B 17/10917 428/428 |
| 9,661,940 | B2 | 5/2017 | Schneider | |
| 9,756,965 | B2 | 9/2017 | Isfort | |
| 10,443,298 | B1 * | 10/2019 | Chin | E06B 3/6612 |
| 11,446,986 | B1 * | 9/2022 | Kingman | B60J 1/007 |
| 2003/0082347 | A1 * | 5/2003 | Nakai | B32B 17/10302 428/192 |
| 2005/0003116 | A1 * | 1/2005 | Demars | E06B 3/6621 428/34 |
| 2008/0295425 | A1 * | 12/2008 | Farag | B32B 17/10293 277/642 |
| 2010/0279038 | A1 * | 11/2010 | Wang | E06B 3/66357 428/156 |
| 2011/0045280 | A1 * | 2/2011 | Varma | E06B 5/165 428/428 |
| 2011/0303287 | A1 * | 12/2011 | Lee | B32B 17/10788 136/259 |
| 2012/0040146 | A1 * | 2/2012 | Garner | C03C 17/28 65/53 |
| 2012/0090253 | A1 | 4/2012 | Beresford et al. | |
| 2012/0121912 | A1 * | 5/2012 | Varma | B32B 17/10743 522/42 |
| 2015/0151511 | A1 * | 6/2015 | Weiss | E06B 3/66333 428/192 |
| 2016/0002512 | A1 * | 1/2016 | Krishnan | E06B 3/6733 428/34 |
| 2016/0108659 | A1 * | 4/2016 | Stark | B32B 7/14 52/786.1 |
| 2016/0130859 | A1 * | 5/2016 | Takada | E06B 3/66 52/202 |
| 2016/0152006 | A1 * | 6/2016 | Boek | C03C 15/00 428/34.7 |
| 2017/0259532 | A1 * | 9/2017 | Eckelt | B32B 17/10761 |
| 2018/0066470 | A1 * | 3/2018 | Dai | C03C 27/10 |
| 2019/0030862 | A1 * | 1/2019 | Akiyama | H04R 7/06 |
| 2019/0100958 | A1 | 4/2019 | Baquet et al. | |
| 2019/0283550 | A1 * | 9/2019 | Notsu | B32B 17/10036 |
| 2020/0141179 | A1 * | 5/2020 | Vianello | E06B 3/6617 |
| 2020/0254730 | A1 * | 8/2020 | Schlögl | B32B 3/266 |
| 2020/0408032 | A1 * | 12/2020 | Schlögl | E06B 3/66333 |

FOREIGN PATENT DOCUMENTS

| | | | | |
|---|---|---|---|---|
| CN | 1423723 A | | 6/2003 | |
| DE | 3110874 A1 | | 9/1982 | |
| DE | 102011009879 A1 | | 8/2012 | |
| DE | 102015007160 A1 | * | 12/2016 | |
| EP | 848133 A1 | * | 6/1998 | ......... E06B 3/66314 |
| EP | 1059414 A2 | * | 12/2000 | ......... E06B 3/66328 |
| EP | 1561894 A2 | * | 8/2005 | .......... E06B 3/6202 |
| EP | 3385486 A1 | | 10/2018 | |
| FR | 74440 E | | 12/1960 | |
| HU | 4867 U | * | 5/2018 | |
| WO | WO-2020195662 A1 | * | 10/2020 | |

OTHER PUBLICATIONS

Machine translation of CH 672612 A5.*
Machine translation of DE 102015007160 A1.*
Machine translation of EP 1561894 A2.*
Machine translation of WO 2020/195662 A1.*
International Preliminary Report on Patentability received for PCT Application No. PCT/IB2020/056008, mailed on Jan. 6, 2022, 07 Pages.
International Search Report and Written Opinion received for PCT Application No. PCT/IB2020/056008, Oct. 30, 2020, 08 Pages.

* cited by examiner

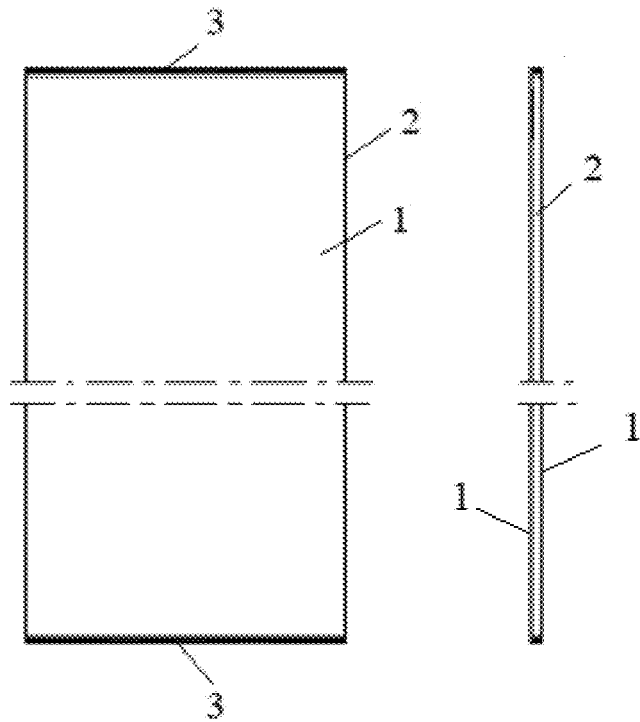
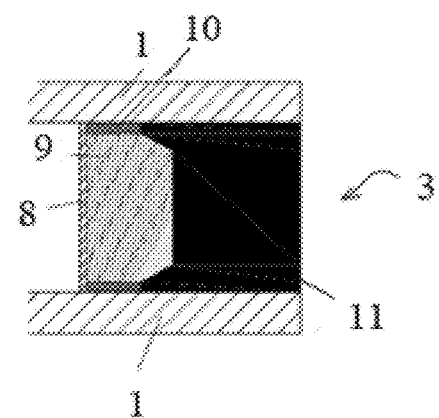
Figure 1
Figure 4
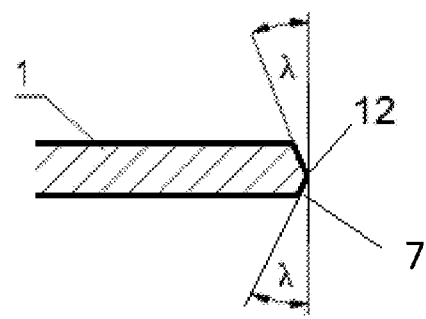
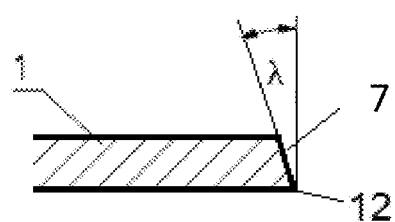
Figure 2

HEAT-INSULATING GLASS PANEL

This application is a national phase of International Application No. PCT/IB2020/056008, filed Jun. 25, 2020, which claims priority to Hungary Application No. P1900231, filed Jun. 26, 2019, and Hungary Application No. P2000207 filed Jun. 25, 2020, which are incorporated herein by reference.

The subject matter of this invention is a polygonal heat-insulating glass panel with straight edges and a flat surface, in which the parallel flat glass panes are connected to each other, at least on one side, by a transparent, hermetically sealed spacer, forming a closed frame with the other sides.

Glass panels enclosing a space filled with air or inert gas between pairs of flat glass panes are well-known in the state of the art. These products have excellent thermal insulation properties because no circular gas flow occurs in the optimally formed space between the glass panes, ensuring good thermal insulation. When manufacturing these products, the glass panes arranged in parallel are connected by a hermetically sealed, closed frame.

For the glass panel structure proposed in patent document No. U.S. Pat. No. 5,948,195 A, the spacer connecting the glass panes at the edges of the structure with glue can be made of metal, plastic, or a combination thereof. There is no specific restriction for the plastic itself: it can be thermoplastic or thermosetting; it can be flexible or rigid; it can be hollow; or can also be made of foam material. The spacer may contain a sealant material; in this case, no glue is needed to bond the glass panes to the spacer.

Patent document No. CA 2813168 A1 presents a heat-insulating sheet structure made of glass or plastic sheets, where spacers connecting the sheets at the edges are composed of a rubber or silicone layer, a vapour-tight polyethylene film layer, and a butyl-based sealing layer coated with a paper or plastic outer layer. When preparing the structure, heat and pressure are applied to the spacers, which makes the sealing layer plastic and after solidification, it fills the space between the transparent sheets at the edges.

The utility model with registration number HU 4867 presents a flat heat-insulating glass structure developed by us, where a spacer placed between parallel flat glass plates at the edges, forming the closed frame, is installed in a way that an end-sealing glass strip is attached to the edge of the flat glass plates using a vapour-tight adhesive seal, and transparent, locally solidified epoxy or acrylic resin plastic is inserted between the inner edge of the glass plates and the end-sealing glass strip to work as spacer.

In certain applications, such as in the case of cooling walls in stores, it is aesthetically desirable that the edge of the heat-insulating glass panel—and so the spacer forming the edge—should be transparent. At the design stage—again for aesthetic reasons—it should be considered that a vapour-tight glass structure is required. When the glass panes are compressed in order to install the spacer, the absence of internal vapour or moisture cannot be guaranteed within the glass structure due to insufficient pressure or the use of unsuitable tools. The same consequence must be expected if the vapour-tightness of the vapour barrier used at the edge of the glass structure or the layer thickness thereof is inadequate.

We intended to design a heat-insulating glass structure that—in line with the aesthetic requirements—is assembled using a spacer with sufficient transparency and adequate vapour-tightness along at least one edge. Along the other edges, the flat glass panes may be connected in a conventional manner, possibly with non-transparent spacers made of different materials.

We want to accomplish this task using a polygonal heat-insulating glass panel with straight edges and a flat surface, in which the parallel flat glass panes enclosing the inner space of the glass panel are connected to each other, at least along one edge, by a transparent, hermetically sealed spacer, forming a closed frame. In practice, the polygonal glass structure usually has a rectangular shape.

The spacer consists of an adhesive mould applied between two glass strips, incorporating thin adhesive flanges on its two opposite sides and a thicker transparent adhesive body in between. The glue constituting the adhesive body and adhesive flange of the spacer is ideally transparent thermoplastic polyurethane.

The material of the flat glass panes is sodium calcium silicate glass, commonly used in construction and sold in panes. Our experiments have shown that perfect vapour-tightness is achieved by chamfering the edges of the flat glass panes in a way that the sealing lip formed by chamfering the flat glass panes at the edges in a way that they can directly contact the edge sealing glass strip pressed between the flat glass panes. The connection between the flat glass panes and the edge sealing glass pane is created using an adhesive, although the two glass panes are also directly connected on a very thin surface, so vapour diffusion is completely prevented. The structure is perfectly transparent, since a less vapour-tight but highly transparent adhesive can also be used for this arrangement as it is not this material that creates the vapour barrier. The vapour barrier is created by the adhesive-free glass/glass connection. At the edge sealing the glass pane, only the sealing lip along the chamfer shows through, the edges of the flat glass panes are not visible.

The glass strips of the spacer are made of tempered aluminosilicate glass or tempered sodium calcium silicate glass, whose mechanical resistance is much higher that of non-tempered glass. The glass strips are not identical: the width of the outer edge sealing glass strip delimiting the edge of the glass structure matches that of the glass panel, while the width of the inner edge sealing glass strip closing the inner space between the glass panels matches that of the inner space of the glass panel.

The objectives of the invention can be achieved by means of the heat-insulating glass panel described in claim 1, the benefits of which are described in the sub-claims.

Figure 3B:
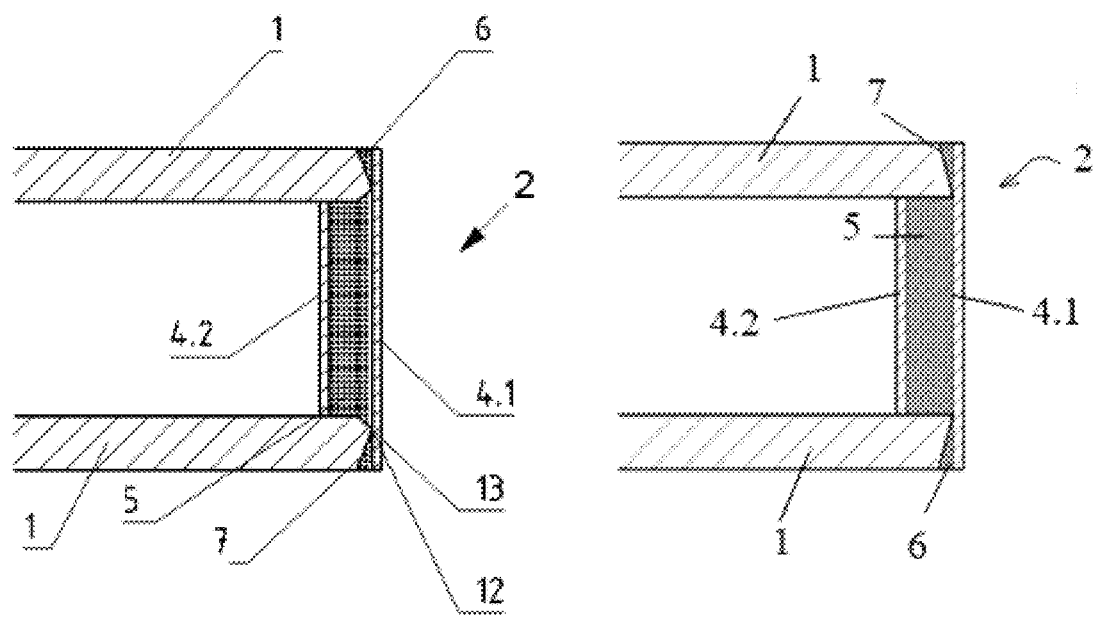

The invention is described in detail with reference to the enclosed drawings, in which FIG. 1 shows the general design of the heat-insulating glass panel;

FIG. 2 shows possible design shapes for the chamfer at the edge of the flat glass pane;

FIG. 3*a* shows the transparent spacer before being glued to the flat glass panes;

FIG. 3*b* shows the transparent spacer glued between the flat glass panes; and FIG. 4 shows a conventional spacer placed between flat glass panes.

FIG. 1 shows a polygonal heat-insulating glass panel with a flat surface according to the invention, the straight edges of which form a rectangle. The glass panel consists of two flat glass panes 1 with a thickness of 2-12 mm arranged in parallel, which are connected by transparent spacers 2 on the two longer sides of the glass pane. In FIG. 1, the flat glass panes 1 are connected to each other on the shorter lower and upper sides using conventional spacers 3. The spacers 2 and 3 form a closed frame along the edges of the glass panel, which encloses the inner space of the glass panel with a hermetic seal. In line with the method and place of use, the non-transparent shorter sides of the glass panel, where the strict aesthetic requirement of perfect transparency does not need to be enforced, can be attached for example to separate frame elements, which can be used to handle the glass pane.

FIG. 2 shows the shapes for the chamfer of the edges of the flat glass panes 1, which ensure the water-tightness of the glass panel. In one of the shapes the edges of the flat glass panes 1 are chamfered—considering the installation situation—with an opening towards the outer space, forming a sealing lip 12, with a bevel angle $\lambda$ of 3-75°. For this shape, the sealing lips 12 are formed by chamfering 7 from one direction only. In the other shape, the flat glass pane 1 is chamfered at an angle $\lambda$ 7 from two directions, resulting in the sealing lip 12.

FIG. 3a shows the structure of the transparent spacer 2, fitted to the edges of the flat glass panes 1. The transparent spacer 2 is a flat T-shaped structural element consisting of a transparent adhesive mould applied between a 0.4-2 mm thick outer edge sealing glass strip 4.1 and an inner edge sealing glass strip 4.2, with sufficient thickness to fill the space between the chamfer 7 and the sealing surface 13. The width of the outer edge sealing glass strip 4.1 matches the structural width of the glass panel, so it seals the edge of the glass panel. The width of the inner edge sealing glass strip 4.2 is 6-26 mm, matching the width of the inner space of the glass panel and the distance between the flat glass panes 1.

The adhesive mould consists of a transparent adhesive body 5 and two adhesive flanges 6 projecting from it to the sides, with a thickness of 0.1-2 mm and a width equal to the thickness of the flat glass pane 1. The production width of the transparent adhesive body 5 exceeds the width of the inner edge sealing glass strip 4.2 by 0.1-0.6 mm. The material of the adhesive is ideally transparent thermoplastic polyurethane. It is well-known in the state of the art that non-transparent polyurethane of two components or becoming crosslinked as a result of air humidity is widely used to seal and glue heat-insulating glass structures.

Glass strips 4.1 and 4.2 of the transparent spacer 2 are made of tempered aluminosilicate glass or tempered sodium calcium silicate glass. Aluminosilicate glass is made of aluminium, silica and oxygen molecules, and is highly resistant to harmful mechanical impacts despite being light and thin, with a thickness of possibly less than 1 mm. The mechanical resistance of a tempered glass strip is many times that of non-tempered glass. The glass is tempered either thermally or by way of a chemical process. In the case of thermal tempering, the glass is heated and then abruptly cooled using air. Chemical tempering is done by heating potassium nitrate to a liquid state, approximately 450° C., and the glass is kept in the melt for the time required to reach the desired level of tempering. As a result, the sodium molecules on the surface of the glass are replaced with much larger potassium molecules, and surface tension is created in the glass.

FIG. 3b shows the transparent spacer 2, glued between the flat glass panes 1. The material of the flat glass panes 1 is sodium calcium silicate glass, commonly used in construction and available in panes. When the transparent spacer 2 is pressed between the flat glass panes 1, their sealing lip 12 cuts through the adhesive from the adhesive body 5 of the transparent spacer 2, which is pressed out by the outer edge sealing glass strip 4.1 towards the sealing lip 7. The adhesive flange 6 of the transparent spacer 2 is also positioned between the chamfered edge of the flat glass pane 1 and the outer edge sealing glass strip 4.1. It is essential that the V-shaped space created by the chamfer 7 is filled by the adhesive, and the thickness of the adhesive flange 6 must be chosen accordingly. The transparent spacer 2 must be pressed between the flat glass panes 1 until the sealing lips 12 of the flat glass panes 1 reach the outer edge sealing glass strip 4.1 without leaving a gap. FIG. 3b shows this situation. Here, the fitted glass panes are fastened by the adhesive within the space created by the chamfer 7, and the glass sealing lip 12 reaching the outer edge sealing glass strip 4.1 provides a perfect vapour barrier for the glass panel, as confirmed by our experiments. This solution also achieves the objective of making almost the entire edge of the glass panel transparent and the fitting of the chamfered sealing lip 12 on the outer edge sealing glass strip 4.1 only appears as a hair-thin strip.

FIG. 4 illustrates the construction of a conventional spacer 3, which may be installed, for example, on the shorter sides of a glass panel according to the invention. It can be seen in the figure that a spacer profile piece 8 is placed between the flat glass panes 1, which can be made of various materials, sealing the inner space between the flat glass panes 1, meaning that its width is the same as that of the inner space. The spacer piece 8 is filled with desiccant material 9, which is fastened to the flat glass panes 1 with a butyl strip 10. The spacer 3 is fastened to the flat glass panes 1 by means of an adhesive 11 suitable for the production of heat-insulating glass, pressed between the butyl strip 10 and the flat glass panes 1.

Below you can find a brief description of the manufacturing process of the glass panel. When manufacturing the transparent spacer 2, the aluminosilicate glass strips are first cut to size, their edges are polished, and then the pieces are tempered. Afterwards, thermoplastic polyurethane is laminated at approx. 110° C. between a piece of cut-to-size and tempered outer edge sealing glass strip 4.1 and an inner edge sealing glass strip 4.2 in a Teflon-coated special tool, forming the "T" shape of the spacer 2.

The longer edge of the flat glass panes 1 is chamfered with a special grinding wheel, and then the panes are tempered in a conventional tempering furnace.

When assembling the glass panels, the profile elements 8 of the conventional spacer 3 are placed on one of the two angled flat glass panes 1, and then is fitted together with the other angled glass panel. Subsequently, the transparent spacers 2 are placed on the longer edges, and then this composition is placed in a press, which allows controlled pressing from three sides per edge. This press is used to press the transparent spacers against the glass panels at approx. 110° C. in a way that the glass edges completely cut through the polyurethane adhesive, creating "glass to glass" sealing on the outer edge sealing glass strip 4.1. After pressing, the excess adhesive flowing out over the edges of the glass panel is removed and after that the lower and upper edges featuring conventional spacers 3 are filled up with a sealant suitable for the production of heat-insulating glass.

At the end of the process, the inner space of the glass panel is filled, where necessary, with argon or krypton gas or air is left in it.

An advantage of the heat-insulating glass structure according to the invention is that its edge is almost perfectly transparent, allowing an aesthetic look suitable for high-quality doors and windows.

As a further advantage of the solution, the outer edge sealing glass strip protects the edge of the glass pane from harmful mechanical effects when being hit, for example when a shopping cart is pushed against it, because in that case only the glass strip is broken rather than the entire glass pane. The impact resistance of the outer edge sealing glass strip can be further improved by gluing a piece of transparent plastic to its outer surface.

The invention claimed is:

1. A polygonal heat-insulating glass panel with straight edges and a flat surface, comprising:
   two parallel flat glass panes;
   a transparent spacer connecting the two parallel flat glass panes to each other, at least on one side of the glass panes, to form a closed frame with other sides of the glass panes, wherein:
   the two parallel flat glass panes and the closed frame enclose an inner space of the glass panel with a hermetic seal,
      the transparent spacer consists of an adhesive mould between an outer edge sealing glass strip and an inner edge sealing glass strip, the adhesive mould having a transparent adhesive body and an adhesive flange, wherein a width of the outer edge sealing glass strip matches a thickness of the glass panel, and a width of the inner edge sealing glass strip closing the inner space of the glass panel matches a thickness of the inner space of the glass panel,
   edges of the glass panes are chamfered to match the adhesive flange, and
      a sealing lip, formed by the chamfered edges of the glass panes, directly contacts a sealing surface of the outer edge sealing glass strip of the transparent spacer.

2. The glass panel according to claim 1, wherein the glass panes comprise sodium calcium silicate.

3. The glass panel according to claim 1, wherein the outer and inner edge sealing glass strips comprise tempered aluminium silicate glass or tempered sodium calcium silicate glass.

4. The glass panel according to claim 3, wherein the outer and inner edge sealing glass strips have a thickness of 0.4-2 mm.

5. The glass panel according to claim 1, wherein the transparent adhesive body and the adhesive flange comprise thermoplastic polyurethane or ethylene vinyl acetate (EVA).

6. The glass panel according to claim 1, wherein the chamfered edges of the glass planes having a bevel angle of 3-75°.

7. The glass panel according to claim 1, wherein the polygonal heat-insulating glass panel is rectangular.

* * * * *